April 14, 1970   J. H. DE CLAIRE ET AL   3,505,772
RETAINER INCLUDING TWO INTERFITTING PARTS
Original Filed Feb. 26, 1968   2 Sheets-Sheet 1

INVENTORS
James H. De Claire, &
BY Floyd L. Dully
Paul Fitzpatrick
ATTORNEY

INVENTORS
James H. De Claire, &
BY Floyd L. Dully
Paul Fitzpatrick
ATTORNEY

_United States Patent Office_

3,505,772
Patented Apr. 14, 1970

3,505,772
RETAINER INCLUDING TWO INTERFITTING PARTS
James H. De Claire, East Detroit, and Floyd I. Dully, Detroit, Mich., assignors to General Motors Corporation, Detroit, Mich., a corporation of Delaware
Continuation of application Ser. No. 708,041, Feb. 26, 1968. This application Apr. 17, 1969, Ser. No. 824,345
Int. Cl. E04b 1/49; A44b 17/00; E04f 19/02
U.S. Cl. 52—511                                    19 Claims

ABSTRACT OF THE DISCLOSURE

A fastener comprises two parts; a plastic body having parallel ridges defining undercut slots between them, and a sheet metal body having a two-dimensional array of headed tabs struck out from it. The tabs enter alternate ones of the slots, the heads of the tabs engaging in the undercut slots with an interference fit. The plane of the tabs is at 45° to the direction of the slots. An installation of these fasteners retaining a trim panel in an automobile body is shown.

---

This application is a continuation of Ser. No. 708,041, filed Feb. 26, 1968, and now abandoned.

Our invention is directed to fasteners and to installations in which fasteners according to our invention are used to mount panels over surfaces such, for example, as the interior surfaces of an automobile body.

The principal objects of our invention are to provide a practical and inexpensive fastener which is easily attached and detached, which is tolerant of misalignment of the parts which are connected, which is easy to manufacture by mass production methods, and which is durable in service.

In its preferred embodiment, a fastening device according to our invention is somewhat related in structure to the trim attaching device shown in Soukup U.S. Patent No. 2,495,870 issued Jan. 31, 1950, the clasp of Anderson Patent No. 2,499,898 issued Mar. 7, 1950, and other subsequent patents in which two devices having headed prongs are coupled together by engagement of the heads of the prongs of one device between the prongs of the other device. It is suitable for use in many cases in place of the retaining devices known as burr-type fasteners.

However, the fastener of our invention is adapted for relatively heavy service and is suited to economical mass fabrication by extrusion of plastic parts and blanking and lancing of sheet metal parts. The conception of our fastening device arose out of a search for an improved solution to the problem of mounting trim panels on the interior of automobile bodies, and it is very well suited to this sort of use; however, as will be clear from the succeeding description of our invention, it is adaptable to many uses.

The nature of our invention and the advantages thereof will be clear to those skilled in the art from the succeeding detailed description of the preferred embodiment of the invention and the accompanying drawings thereof.

Figure 1:
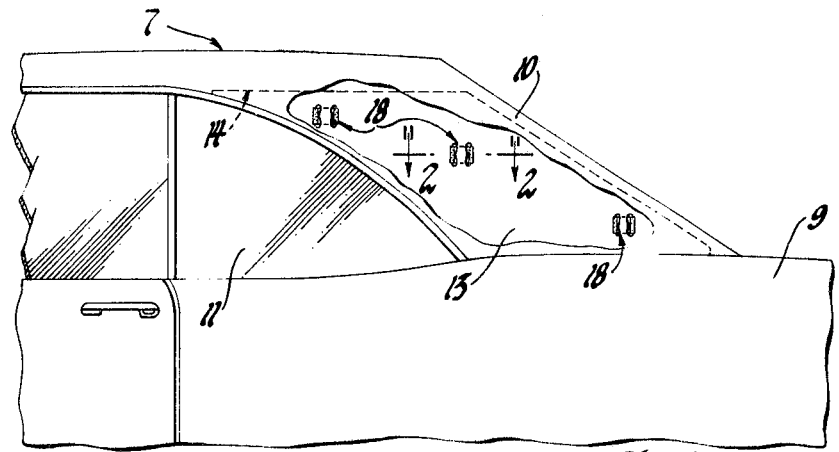
FIGURE 1 is a fragmentary side elevation view of an automobile body, with parts cut away.

Referring first to FIGURE 1, there is illustrated an automobile body 7 including a rear quarter panel 9 and an upper rear quarter panel or sail panel 10. This panel extends rearwardly from the rear quarter window 11 of the vehicle. The panel 10 is cut away to show an inner panel 13 which extends generally fore and aft of the vehicle and generally vertically within the outer panel.

The interior of the inner panel is lined by a trim panel 14, indicated by the broken lines in FIGURE 1, which is of roughly parallelogram shape to conform to the upper rear quarter panel. The particular structure of the trim panel is immaterial but it may, as usual, comprise a foundation board 15 of a heavy generally papery material and an ornamental outer layer 17 of polyvinyl chloride or fabric or any other suitable sheet material and an ornamental outer layer 17 of polyvinyl chloride or fabric or any other suitable sheet material with or without padding.

As illustrated in FIGURE 1, there are three sets 18 of fasteners which support the trim panel 14 on the inner body panel, each fastener set comprising a part coupled to the body panel and a part fixed to the trim panel. Each fastener set 18, as shown most clearly in FIGURES 2, 3, and 7, comprises a generally rectangular piece 21, which may be termed the first or the resilient fastener part, is mounted on the inner body panel, and a second or sheet metal rectangular part 22 which is fixed to the trim panel foundation board 15. Our invention lies particularly in the structure of the two parts 21 and 22. Either of these parts might be fixed to the body panel or to the trim panel, but, in the preferred embodiment, they are adapted for mounting by plugging the first part into openings in the body panel and attaching the second part to the trim panel by prongs struck from it which are forced into the trim panel.

The first body part 21 is preferably of a somewhat flexible or resilient plastic material such as nylon or ABS plastic. It is geometrically cylindrical so that it may be fabricated by extruding from a die and severing suitable lengths to form the individual fastener parts 21. The first fastener part 21 comprises a preferably square or rectangular back 23 from which extends a number of parallel ribs 25, the free edges of which are broadened or flanged as indicated at 24 in FIGURE 2 so that they define between them undercut slots 26. In the particular structure illustrated, there are ten such ribs. As an indication of the preferred scale of the device, this fastener in practice is about one inch square, although there is nothing critical about the dimensions or the number of ribs. The part 21 includes two webs 27 of tapered or wedge shape which define shoulders 28 on their forward or outer faces. The webs 27 and the back 23 are sufficiently flexible that the webs 27 may be pressed together so as to enter two elongated openings 30 in the panel 13. The webs spring apart so that the shoulders 28 lie behind the panel when it is fitted. It may be noted that the slots 30 are so shaped as to be slightly wider towards their ends, providing a slight clearance between the ends of webs 27 and the walls of the slots. This provides for a minor amount of rotation of the fastener part around an axis perpendicular to the body panel, for alignment to accommodate tolerances in manufacture. Of course, other means for retaining the fastener part on the panel may be used.

Figure 2:
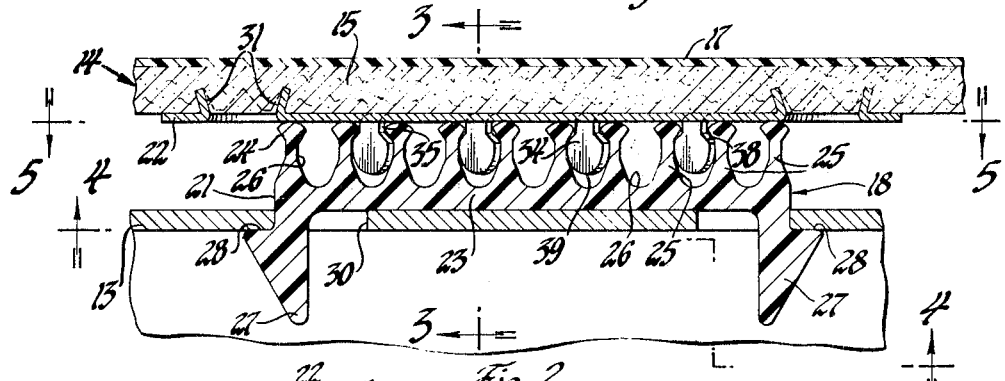
FIGURE 2 is a horizontal sectional view of a fastener installation on an enlarged scale, taken on the plane indicated by the line 2—2 in FIGURE 1.
Figures 3, 4:
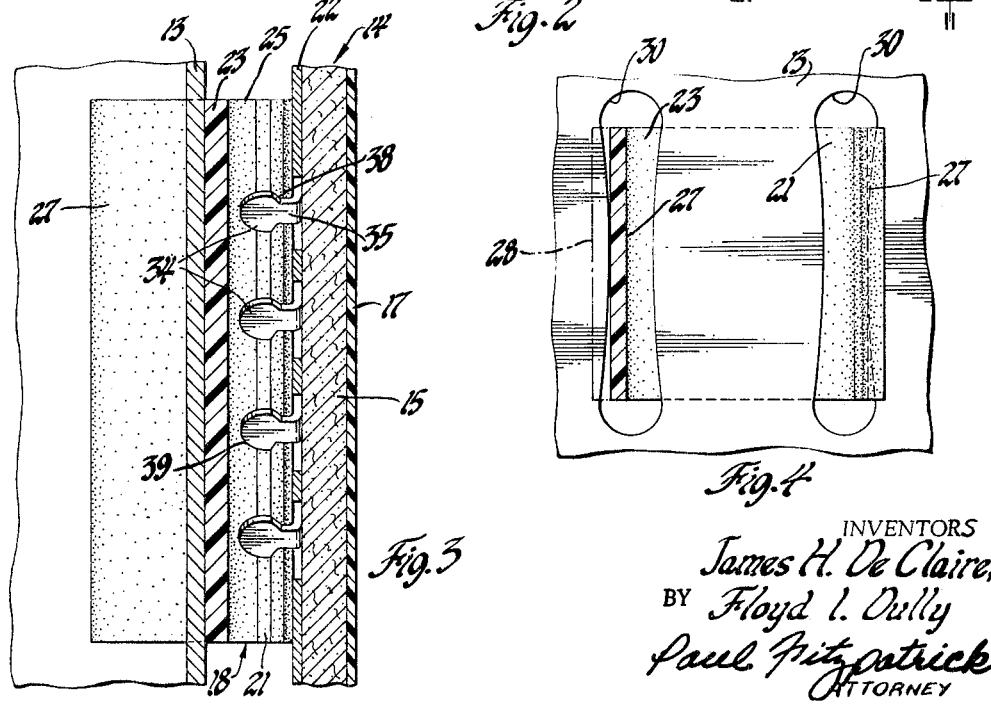
FIGURE 3 is a vertical sectional view taken on the plane indicated by the line 3—3 in FIGURE 2.
FIGURE 4 is a fragmentary sectional view taken on the plane indicated by the line 4—4 in FIGURE 2.
Figure 5:
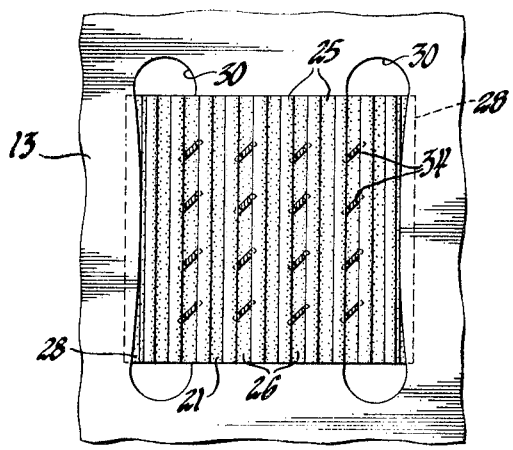
FIGURE 5 is a fragmentary sectional view taken on the plane indicated by the line 5—5 in FIGURE 2.
Figure 6:
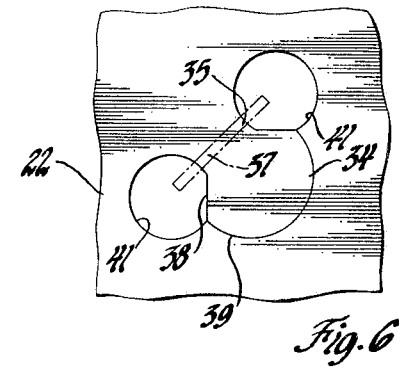
FIGURE 6 is an enlarged fragmentary view of the sheet metal fastener part illustrating a step in the manufacture thereof.
Figure 7:
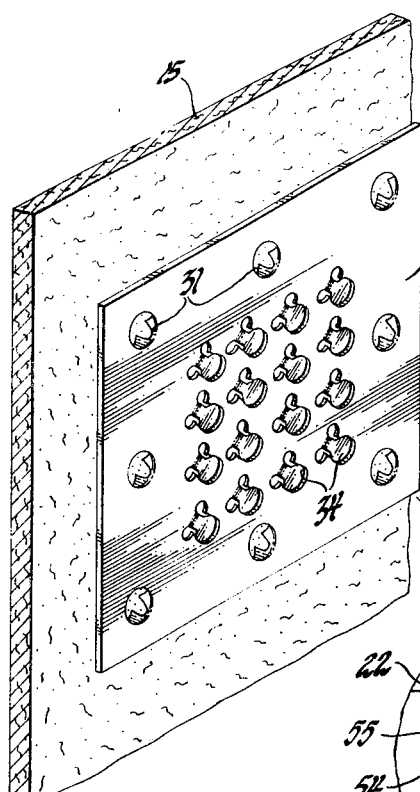
FIGURE 7 is an exploded axonometric view of the trim panel installation.
Figure 7:
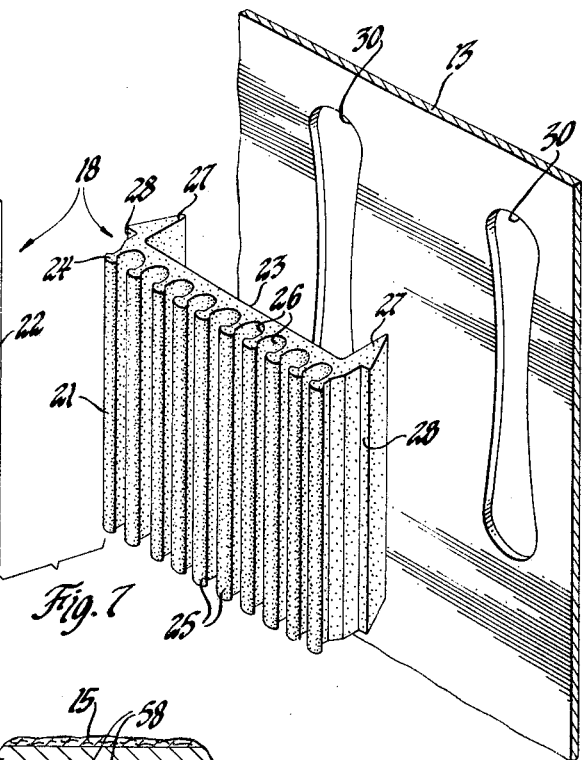

Proceeding now to a description of the second or sheet metal fastener part, this is shown most clearly in FIGURES 2, 3, and 7, and a step in the manufacture is illustrated in FIGURE 6. The fastener 22 is not necessarily of metal but it is preferably of metal and, for the installation concerned, preferably of sheet steel. It is preferably of square or rectangular outline as illustrated, and may be cut off from a strip of sheet metal before or after forming to provide the means for attaching it to the foundation board 15 and coupling it to the first fastener part 21. The illustrated mode of attachment to the foundation board 15 is conventional. Eight sets of prongs 31 are distributed around the margin of the fastener part.

Each of these may be defined by a punch which pierces the sheet metal and cuts it into four pointed prongs which flare slightly, as shown clearly in FIGURE 2, so that, when driven into the soft foundation board, they spread slightly and anchor the fastener part of the trim panel. Any other desired means for attaching the fastener part to the panel may be used.

The outer face of the part 22 bears, as shown, a two-dimensional array of headed bosses provided by sixteen tabs disposed in four rows and four columns. This number is not critical, but a plural number of rows and columns is highly desirable. The tabs 34 are headed; the shape is most clearly shown in FIGURE 6 which illustrates a fragment of the sheet 22 as it appears before the tab is lanced out from the sheet. Note that the tab includes a neck 35 which is bent through 90° when the tab is forced out to its finished position in the plane indicated by the broken outline 37 in FIGURE 6. It includes a diverging portion defined by preferably straight edges 38 and it is defined by a rounded outer end along the preferably circular arc 39. Holes 41 are punched in the sheet at each side of the neck 35 to facilitate entry of the punch which forms the tabs.

When the two parts of the fastener are pressed together, the heads of the tabs 34 lie within the slots 26 beneath the flared outer edges of the ribs 25 and the necks 35 of the tabs lie between these flared outer edges. There is an interference fit between the tabs and the ribs.

It should be noted that the plane of the sheet metal tabs 34 is inclined at 45° to the edges of the fastener part 22.

Thus, the same fit is achieved between the two fastener parts regardless of whether the part 22 is in the position shown or rotated through any multiple of 90°. In the interference fit, it is possible for the tabs to be twisted slightly and thus yield elastically in response to a torsional couple exerted upon them by the ribs. It should also be noted that the tabs 34 are preferably so spaced that they enter into alternate ones of the slots 26. Thus, each individual rib 25 may readily flex in one direction only as the tabs enter between the ribs. Other dispositions are possible; for example, if it is desired to stagger the arrangement of the tabs so that the tabs on each side of a particular rib engage it at substantially spaced distances so that the rib is deflected in a sinuous manner between tabs, this may also be done. It is not preferred, however.

It may also be noted that the edges of the tabs are square or 90° edges resulting from the blanking out of the metal which tend to bite into or engage to some extent the plastic fastener part so as to resist sliding movement of the sheet metal fastener longitudinally of the slots in the plastic fastener part.

The flexibility of the installation, and tolerance of misalignment of the parts, of our fastener is of very considerable importance. In the direction of movement longitudinally of slots 26, the alignment may take place at any point. In other words, the relative location of the two parts may be shifted by infinitesimal increments. In the transverse direction, across the slots, the fit may be moved the width of the distance from one slot to another in either direction in the structure illustrated. With a fastener approximately an inch square, this allows a shift of approximately one-tenth of an inch in each direction. If desired, the connection between the plastic fastener and the body panel may be such as to accommodate a small amount of play, such as one-twentieth of an inch in this case, so that again there is a high degree of flexibility of alignment of the parts to accommodate for tolerances in assembly and variations in dimensions of parts.

In the installation shown in FIGURE 1, all of the plastic fastener parts 23 are aligned in the same direction, with the slots vertical, which is preferred for this installation. In some cases, it may be desirable to have the slots in some of the fasteners transverse to those in other fasteners, so that a more positive location of the mounted parts in both directions of movement over the panel is provided.

The mode of use of the fastener should be apparent from the foregoing, but it may be pointed out that the prongs 31 of the fastener parts 22 are pressed into the trim panel 14 before, or preferably after, it is completed by provision of the trim fabric or pad on its exposed surface. The fastener parts 21 are pressed into the openings in the body panel, then the trim panel 14 is brought into position and simply pressed against the body panel so that the tabs 34 enter into the slots 26, flexing the ribs 25. the tabs lodge behind the heads of ribs 25 and the assembly is complete. The panel may be pulled off without damage but is securely retained, except for such intentional removal.

Figure 8:
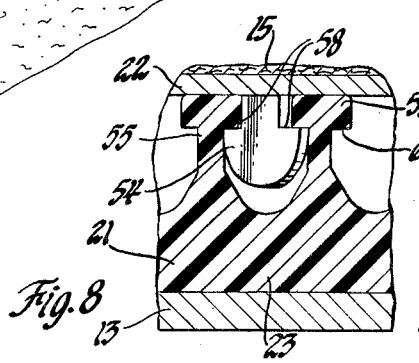
FIGURE 8 is a fragmentary enlarged view similar to FIGURE 2 illustrating a modified structure.

In the preferred embodiment of the invention described above, the coupling of the two fasteners is impositive because of the ramp angles at 38 on the tabs. If it is desired to use a fastener combination according to our invention with structure such that it cannot readily be pulled apart, this can easily be accomplished by eliminating the ramps or slopes on the parts so that there is positive retention. This is illustrated in the fragmentary view of FIGURE 8 in which parts correspond to those shown in FIGURE 2, but with modified contours of the flanged ribs and headed bosses. In FIGURE 8, the sheet 22 has tabs 54 each of which has two shoulders 58 which are parallel to the sheet 22; otherwise, the tabs may be essentially the same as tabs 34. The back 23 of the fastener part 21 bears ribs 55 having flanged heads 59 defining a shoulder 60 parallel to the back 23. In this case, once the two fastener parts are pressed together, they cannot be taken apart by pulling them away from each other without destroying the fastener. It would still be possible to disassemble them by movement along the direction of the slots, if this is not otherwise prevented.

We claim:

1. A fastener combination comprising a first part of geometrically cylindrical cross-section suitable for manufacture by extrusion, the first part having a face bearing a plural number of flanged ribs defining between them a plural number of undercut slots; and a second part defined by a metal sheet bearing a plural number of rows of headed bosses defined by tabs struck from the sheet extending from a face of the sheet in position to enter a plural number of the slots in the first part, the heads of the bosses being sufficiently wide in the dimension transverse to the ribs to lodge in the undercut slots and be retained by the flanged ribs, at least one of said parts being of a material yieldable to permit entry of the bosses into the slots.

2. A combination as recited in claim 1 in which the faces of the tabs are at an acute angle to the trend of the ribs.

3. A combination as recited in claim 2 in which the acute angle is substantially 45°.

4. A combination as recited in claim 1 in which the tabs are spaced so as to enter only every alternate slot.

5. A combination as recited in claim 1 in which the tabs are spaced so as to enter immediately adjacent slots and to engage opposite sides of the ribs at points staggered along the ribs.

6. A combination as recited in claim 1 in which at least one surplus slot is provided to allow full engagement of the two parts in at least two relative positions in the direction transverse to the trend of the ribs.

7. A combination as recited in claim 1 in which the face opposite to the above-recited face of at least one part bears means for attaching it to a panel or the like.

8. A combination as recited in claim 7 in which the said attaching means provides for limited relative movement between the said part and the panel or the like.

9. A combination as recited in claim 1 in which the structure of the ribs and tabs is such as to provide an impositive detention in the direction perpendicular to the faces.

10. A combination as recited in claim 1 in which the structure of the ribs and tabs is such as to provide a positive detention in the direction perpendicular to the faces.

11. A combination as recited in claim 1 in which the tabs have edges engaging the ribs with a line contact to inhibit relative movement of the parts in the direction of extension of the ribs.

12. The combination of a first part of a yieldable resilient material of a geometrically cylindrical cross-section suitable for manufacture by extrusion and severing, the first part having a face bearing a plural number of flanged ribs defining between them a plural number of undercut slots; and a second part defined by a sheet of rigid material bearing a two-dimensional array of a plural number of rows of headed tabs struck from the sheet and extending from a face of the sheet in position to enter a plural number of the slots in the first part, the heads of the tabs lying in planes at approximately 45° to the direction of the ribs and being sufficiently wide in the dimension transverse to the ribs to lodge in the undercut slots under the flanges of the ribs and effect an interference fit with the flanged ribs.

13. A combination as recited in claim 12 in which the bosses are spaced so as to enter only every alternate slot.

14. A combination as recited in claim 12 in which at least one surplus slot is provided to allow full engagement of the two parts in at least two relative positions in the direction transverse to the trend of the ribs.

15. A combination as recited in claim 12 in which the structure of the ribs and bosses is such as to provide an impositive detention in the direction perpendicular to the faces.

16. A combination as recited in claim 12 in which the structure of the ribs and bosses is such as to provide a positive detention in the direction perpendicular to the faces.

17. A combination as recited in claim 12 in which the bosses have edges engaging the ribs with a line contact to inhibit relative movement of the parts in the direction of extension of the ribs.

18. The combination of a first panel, a second panel overlying the first panel, a first fastener part connected to the first panel and disposed between the panels, and a second fastener part connected to the second panel and disposed in position to engage the first fastener part when the panels are brought together; the first fastener part bearing a number of parallel flanged ribs on its outer face defining a plural number of undercut slots between the ribs, and the second fastener part bearing a plural number of headed bosses arrayed on its outer face disposed to enter a plural number of the said undercut slots, with the heads of the projections in dovetail relation to the said ribs.

19. A combination as recited in claim 18 in which one panel is a vehicle body panel and the other panel is a body interior trim panel.

References Cited

UNITED STATES PATENTS

| | | | |
|---|---|---|---|
| 938,768 | 11/1909 | Kenny | 52—718 |
| 1,829,976 | 11/1931 | Bennett | 52—385 X |
| 2,039,686 | 5/1936 | Gagnier | 52—511 X |
| 2,202,568 | 5/1940 | Worden | 52—387 |
| 2,262,426 | 11/1941 | Hall | 52—511 |
| 2,495,870 | 1/1950 | Soukup | 52—750 |
| 2,499,898 | 3/1950 | Anderson | 24—206 |
| 2,800,743 | 7/1957 | Meehan et al. | 46—25 |

ALFRED C. PERHAM, Primary Examiner

U.S. Cl. X.R.

24—201, 204; 52—717